US008840083B2

(12) United States Patent
Borchsenius et al.

(10) Patent No.: US 8,840,083 B2
(45) Date of Patent: Sep. 23, 2014

(54) INTAKE VALVE FOR A CYLINDER OF THE HIGH-PRESSURE FUEL PUMP OF A COMMON RAIL INJECTION SYSTEM

(75) Inventors: Fredrik Borchsenius, Donaustauf (DE); Hans-Jörg Koch, Brennberg (DE); Anatoliy Lyubar, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 277 days.

(21) Appl. No.: 13/119,991

(22) PCT Filed: Sep. 18, 2009

(86) PCT No.: PCT/EP2009/062138

§ 371 (c)(1), (2), (4) Date: Apr. 20, 2011

(87) PCT Pub. No.: WO2010/034673

PCT Pub. Date: Apr. 1, 2010

(65) Prior Publication Data

US 2011/0186767 A1 Aug. 4, 2011

(30) Foreign Application Priority Data

Sep. 23, 2008 (DE) ......................... 10 2008 048 450

(51) Int. Cl.

| | |
|---|---|
| ***F16K 47/00*** | (2006.01) |
| ***F16K 1/00*** | (2006.01) |
| ***F16K 15/00*** | (2006.01) |
| ***F02M 59/46*** | (2006.01) |
| ***F04B 1/04*** | (2006.01) |

(52) U.S. Cl.
CPC ............ *F04B 1/0426* (2013.01); *F02M 59/464* (2013.01)
USPC ........................................... 251/121; 251/333

(58) Field of Classification Search
CPC ............. F16K 1/34; F16K 1/54; F16K 47/08; F02M 63/007
USPC ........................... 251/121, 122, 333; 137/469
See application file for complete search history.

(56) References Cited

U.S. PATENT DOCUMENTS 1,970,726 A * 8/1934 Barrett .......................... 251/122
2,875,779 A 3/1959 Campbell (Continued)

FOREIGN PATENT DOCUMENTS

| | | | | |
|---|---|---|---|---|
| DE | 19902259 A1 | 7/2000 | ............. | F02M 59/48 |
| EP | 1251267 A2 | 10/2002 | ............. | F02M 59/46 |
| EP | 1557559 A1 | 7/2005 | ............. | F02M 45/04 |

(Continued)

OTHER PUBLICATIONS

International PCT Search Report and Written Opinion, PCT/EP2009/062138, 11 pages, Jan. 14, 2010.
Chinese Office Action, Application No. 200980137289.9, 10 pages, Jul. 18, 2013.

*Primary Examiner* — John K Fristoe, Jr.
*Assistant Examiner* — Michael R Reid
(74) *Attorney, Agent, or Firm* — King & Spalding L.L.P.

(57) ABSTRACT

An intake valve for a cylinder of the high-pressure fuel pump of a common rail injection system has a valve body with an inlet opening and a closing member. The closing member closes the inlet opening in a first end position. The member can be moved relative to the inlet opening depending on a pressure difference. The intake valve has a non-linear volumetric flow characteristic.

12 Claims, 3 Drawing Sheets

(56) References Cited

U.S. PATENT DOCUMENTS

| | | | | |
|---|---|---|---|---|
| 3,703,908 | A * | 11/1972 | Tellier | 137/238 |
| 6,224,350 | B1 | 5/2001 | Guentert et al. | 417/273 |
| 7,028,983 | B2 * | 4/2006 | Ozaki et al. | 251/149.6 |
| 2002/0153502 | A1 | 10/2002 | Walsh | 251/121 |
| 2008/0111089 | A1 * | 5/2008 | Hasunuma | 251/122 |

FOREIGN PATENT DOCUMENTS

| | | | | |
|---|---|---|---|---|
| GB | 2063428 | A | 6/1981 | F16K 1/54 |
| WO | 01/40657 | A1 | 6/2001 | F04B 53/10 |

* cited by examiner

INTAKE VALVE FOR A CYLINDER OF THE HIGH-PRESSURE FUEL PUMP OF A COMMON RAIL INJECTION SYSTEM

CROSS-REFERENCE TO RELATED APPLICATIONS

This application is a U.S. National Stage Application of International Application No. PCT/EP2009/062138 filed Sep. 18, 2009, which designates the United States of America, and claims priority to German Application No. 10 2008 048 450.4 filed Sep. 23, 2008, the contents of which are hereby incorporated by reference in their entirety.

TECHNICAL FIELD

The invention relates to an intake valve for a cylinder of the high-pressure fuel pump of a common rail injection system.

BACKGROUND

Diesel motor vehicles which contain a common rail injection system are already known. In said systems, the rail pressure is one of the main parameters which influence the fuel injection quantity. For this reason, the presence of as stable a rail pressure as possible is an essential precondition for accurate metering of the fuel injection quantity.

In what is known as a VCV closed loop control system, the rail pressure is dependent on the cylinder filling of the high-pressure fuel pump. Non-uniform filling of the cylinders in a two cylinder pump or a three cylinder pump leads to pressure fluctuations in the rail. Non-uniform filling of this type of the cylinders can be ascribed, inter alia, to different volumetric flow characteristics of the inlet valves of the cylinders. The different volumetric flow characteristics of the inlet valves are caused, in particular, by different opening pressures of the inlet valves of the cylinders, which inlet valves are realized as an intake valve. The different opening pressures are to be ascribed, for example, to production-related different spring prestresses of the inlet valves and/or to undefined contact lines between the closing body and the valve seat of the inlet valves. Furthermore, the stated contact line of an inlet valve can change in the first operating hours of the inlet valve as a result of a deformation of the valve seat in an undesired manner.

FIG. 1 shows one example for the dependence of the cylinder filling on the opening pressure of the inlet valve. Here, the pressure difference dP in bar is shown along the ordinate and the fuel inlet quantity Q in liters per minute is shown along the abscissa. The curve K1 describes an inlet operation, in which the opening pressure corresponds to a pressure difference dP of 1.2 bar, and the curve K2 describes an inlet operation, in which the opening pressure corresponds to a pressure difference dP of 1.4 bar. It can be seen that, if a pressure difference dP of 1.5 bar is present, the inlet quantity at an opening pressure of the inlet valve of 1.2 bar is greater by $\Delta Q \approx 0.1$ l/min than the inlet quantity at an opening pressure of the inlet valve of 1.4 bar. Furthermore, it can be seen from FIG. 1 that the volumetric flow characteristic of conventional inlet valves is linear, that is to say the change in the inlet quantity proceeds linearly with respect to a change in the pressure difference dP.

FIG. 2 shows a diagram, in which the delivery volume of the cylinders is shown as a function of time. Here, the conveying volume in liters is plotted along the ordinate and the time in seconds is plotted along the abscissa. The curve K3 with the continuous lines is assigned to a cylinder, the inlet valve of which has an opening pressure of 1.4 bar, and the curve K4 with the dashed lines is assigned to a cylinder, the inlet valve of which has an opening pressure of 1.2 bar. It can be seen that the delivery volume of both cylinders deviates by $\Delta Q \approx 0.02$ liter per inlet operation.

The non-uniform filling described in the preceding text of the cylinders of a high-pressure fuel pump can lead in the extreme case to a failure of a cylinder. This means that a two or three cylinder pump operates like a one cylinder pump at very low inlet quantities.

The opening pressure of an inlet valve lies in the range between 1.2 and 1.7 bar. At an opening pressure which is lower than 1.2 bar, the risk increases that an air/liquid mixture is sucked through the intake valve into the compression chamber. As a result of the entrained, compressible air, no complete filling is achieved and the pressure pulses in the rail increase.

At an opening pressure which is greater than approximately 1.7 bar, the losses during the starting operation of the engine rise. Said losses manifest themselves in such a way that the filling of the compression chamber of the high-pressure pump is limited by late opening of the intake valves, as a result of which the starting time increases on account of reduced quantities or pressure availability.

In the context of the production of inlet valves of this type, said inlet valves are measured and divided into different classes. In practice, production failures of up to 50% occur with the current design.

SUMMARY

According to various embodiments, an inlet valve for a cylinder of the high-pressure fuel pump of a common rail injection system can be specified, in which the above-described disadvantages are reduced.

According to an embodiment, an intake valve for a cylinder of the high-pressure fuel pump of a common rail injection system, may have a valve body, which has an inlet opening, and a closing body which can be moved relative to the inlet opening and closes the inlet opening in a first end position, characterized in that the volumetric flow characteristic of the intake valve is non-linear.

According to a further embodiment, the contour of the closing body and/or the contour of the valve body can be designed in such a way that the volumetric flow characteristic is non-linear.

According to a further embodiment, on its side which faces the inlet opening, the closing body may have a step and/or a bevel. According to a further embodiment, on its side which faces the inlet opening, the closing body may have a right-angled transition. According to a further embodiment, the intake valve's opening area can be in a non-linear relationship with a pressure difference. According to a further embodiment, the inlet opening can be a hollow-cylindrical inlet channel. According to a further embodiment, the closing body may have a cylindrical projection which protrudes into the inlet channel. According to a further embodiment, the closing body may have a cylindrical collar, the diameter of which is greater than the diameter of the cylindrical projection, and in that the transition point between the cylindrical projection and the collar is of right-angled configuration.

BRIEF DESCRIPTION OF THE DRAWINGS

Further advantageous properties of the invention result from its following exemplary explanation using the further figures, in which.

DETAILED DESCRIPTION

Figure 1:
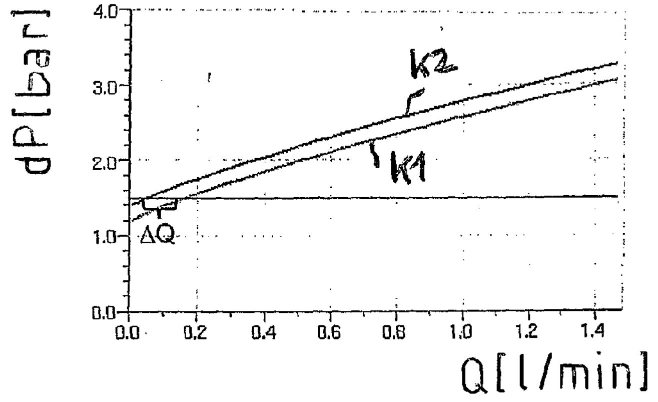
FIG. 1 shows one example for the dependence of the cylinder filling on the opening pressure of the inlet valve.
Figure 2:
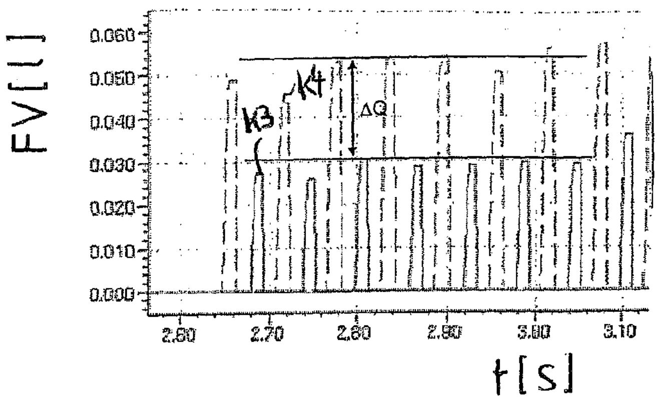
FIG. 2 shows a diagram, in which the delivery volume of the cylinders is shown as a function of time.

According to various embodiments, an intake valve may have an inlet opening and a closing body, the closing body closing the inlet opening in a first end position and being movable relative to the inlet opening as a function of a pressure difference, and the intake valve having a non-linear volumetric flow characteristic.

In a manner which is simple to realize, said non-linear volumetric flow characteristic can be achieved by a corresponding design of the contour of the closing body of the intake valve. On its side which faces the inlet opening, the closing body preferably has a bevel and/or a step. This advantageously achieves a situation where the opening area of the inlet valve is in a non-linear relationship with the pressure difference.

The inlet opening is preferably a hollow-cylindrical inlet channel and the closing body is preferably a cylindrical projection which protrudes into the inlet channel. This has the advantage that a respectively desired non-linear volumetric flow characteristic of the inlet valve can be set particularly accurately.

According to an embodiment, this accuracy can be increased further by the fact that the closing body has a cylindrical collar, the diameter of which is greater than the diameter of the cylindrical projection, the transition points between the cylindrical projection and the collar being of right-angled configuration.

According to various embodiments, an intake valve for a cylinder of the high-pressure fuel pump of a common rail injection system has an inlet opening, through which fuel which is conveyed into a fuel annular channel passes into the valve body from a tank by means of a prefeed pump. From said valve body, the fuel is transported via an outlet opening of the intake valve into an associated cylinder of the high-pressure fuel pump. This is followed by closure of the inlet valve, compression of the fuel which is situated in the cylinder by means of a piston which is moved in the cylinder, and discharging of the compressed fuel via a rail line into the rail.

Furthermore, an intake valve according to various embodiments has a closing body which is connected to a spring and, in a first end position, closes the inlet opening of the intake valve when the spring is relieved.

Furthermore, the closing body can be moved relative to the inlet opening as a function of the pressure difference which exists between the pressure existing in the fuel annular channel and the sum of the pressure in the cylinder and the pressure caused by the closing force of the spring, in order to open or to close the intake valve. If the pressure of the fuel in the fuel annular channel becomes higher than the sum of the pressure in the cylinder and the pressure caused by the closing force of the spring, the inlet valve is opened. If the pressure of the fuel in the fuel annular channel is lower than the sum of the pressure in the cylinder and the pressure caused by the closing force of the spring, the inlet valve is closed.

An intake valve according to various embodiments has a non-linear volumetric flow characteristic, as will be explained in the following text.

Different fillings of the cylinders of a high-pressure fuel pump depend to a great extent on the slope of the volumetric flow characteristic of the inlet valves of the cylinders, which inlet valves are realized as intake valves. If a consistent pressure is present, considerably smaller deviations in the inlet quantities are obtained in the case of steeper volumetric flow characteristics.

Figure 3:
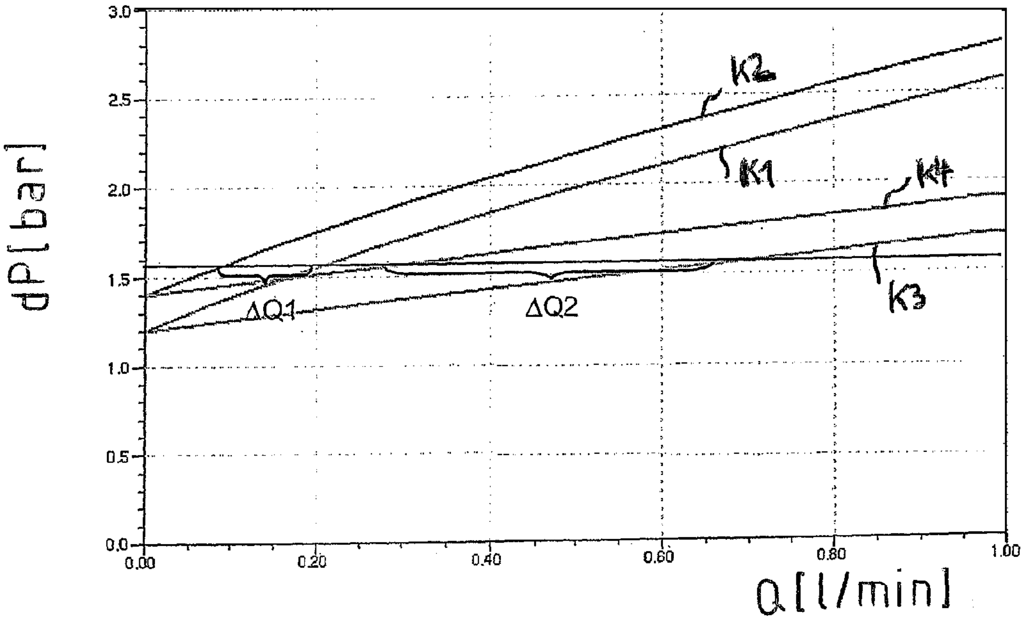
FIG. 3 shows a diagram for illustrating the dependence of the cylinder filling on the slope of the volumetric flow characteristic curve.

This is illustrated in FIG. 3. In said figure, the pressure difference dP in bar is plotted along the ordinate and the inlet quantity Q in liters per minute is plotted along the abscissa. The curve K1 describes an inlet operation, in which the opening pressure corresponds to a pressure difference dP of 1.2 bar, and the curve K2 describes an inlet operation, in which the opening pressure corresponds to a pressure difference dP of 1.4 bar. The curve K3 describes an inlet operation, in which the opening pressure likewise corresponds to a pressure difference of 1.2 bar, and the curve K4 describes an inlet operation, in which the opening pressure corresponds to a pressure difference dP of 1.4 bar. The curves K1 and K2 have a greater slope than the curves K3 and K4.

It can be seen from a comparison of the curves that, for example if a pressure difference dP=1.58 bar is present, the inlet quantity deviation ΔQ1 is substantially smaller in the case of a steeper course of the volumetric flow characteristic, as is described by the curves K1 and K2, than the inlet quantity deviation ΔQ2 in the case of a flatter course of the volumetric flow characteristic, as is described by the curves K3 and K4:

$$\Delta Q1 < \Delta Q2.$$

A steep volumetric flow characteristic which can be realized, for example, using a spring with a relatively great rigidity causes relatively large pressure losses, however, and is not acceptable for a full fuel delivery.

According to various embodiments, a non-linear volumetric flow characteristic of the inlet valves achieves a situation where the inlet quantity deviations of the inlet valves of a high-pressure fuel pump are reduced in comparison with the prior art.

Figure 4:
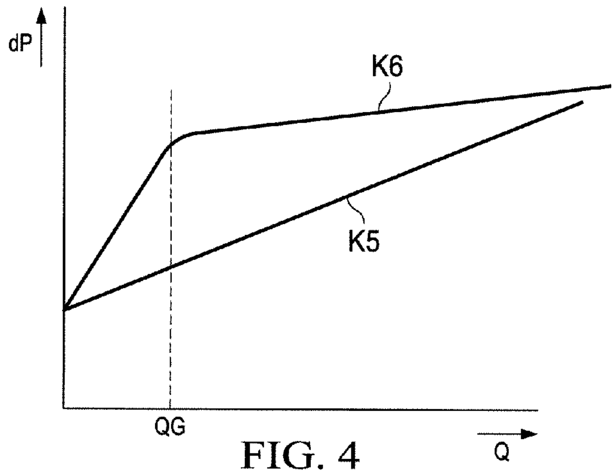
FIG. 4 shows a diagram for illustrating a linear and a non-linear volumetric flow characteristic of an intake valve.

This is illustrated using FIG. 4, in which the pressure difference dP is plotted along the ordinate and the inlet quantity Q is plotted along the abscissa. The curve K5 describes a linear volumetric flow characteristic, and the curve K6 describes a non-linear volumetric flow characteristic. In the case of fuel inlet quantities which are smaller than QG, the curve K6 has a substantially steeper course than the curve K5 and, in the case of fuel inlet quantities which are greater than QG, has a flatter course than the curve K5. This brings about a situation where the inlet valves of the cylinders of a high-pressure fuel pump require greater pressure differences dP, in order to increase the inlet quantity Q, and leads to smaller deviations in the filling of the different cylinders of the high-pressure fuel pump in the case of relatively small inlet quantities.

The volumetric flow characteristic of a conventional inlet valve can be described by Bernoulli's equation:

$$Q=\mu\cdot A\cdot sqrt(2\cdot dP/rho),$$

where Q is the fuel quantity, A is the opening area of the inlet valve, dP is the pressure difference and rho is the density of the medium. The opening area A of a conventional inlet valve is a linear function of the pressure difference.

In order to achieve the non-linear characteristic according to various embodiments, a non-linear function for the opening area A=f(dP) is realized either by a suitable geometrical contour of the closing body or by a suitable inner geometry of the valve body. Here, the desired non-linearity is achieved by a combination of the Bernoulli flow and the gap flow. This will be explained in greater detail in the following text using FIGS. 5-8.

Figure 5:
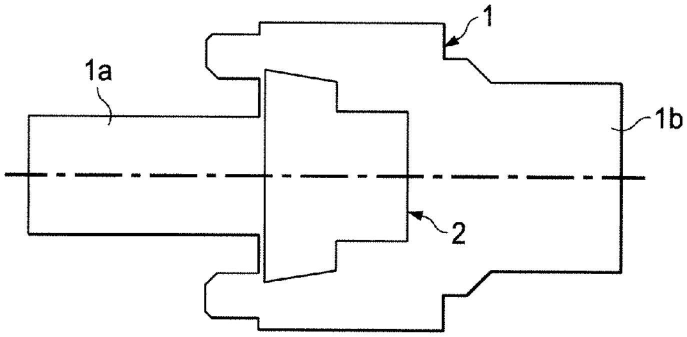
FIG. 5 (PRIOR ART)
FIG. 5 shows a diagram of an intake valve with a linear volumetric flow characteristic.

FIG. 5 shows a diagram of an intake valve with a linear volumetric flow characteristic. The intake valve which is shown has a valve body 1 which contains a hollow-cylindrical inlet opening 1*a* and an outlet opening 1*b*. Furthermore, the intake valve which is shown has a closing body 2. The closing body 2 is connected to a spring (not illustrated) and closes the inlet opening 1*a* in the relieved state of said spring, with the result that no fuel can pass out of the fuel annular channel into the interior of the valve body 1 and from there via the outlet opening 1*b* into the associated cylinder of the high-pressure fuel pump. The closing body 2 is configured to be flat in the direction of the inlet opening 1*a*. If the pressure of the fuel in the fuel annular channel becomes higher than the sum of the pressure of the fuel in the cylinder and the pressure caused by the closing force of the spring, the closing body 2 is moved to the right in FIG. 5, as a result of which the intake valve is opened. The volumetric flow characteristic of an intake valve which is constructed in this way is linear.

Figure 6:
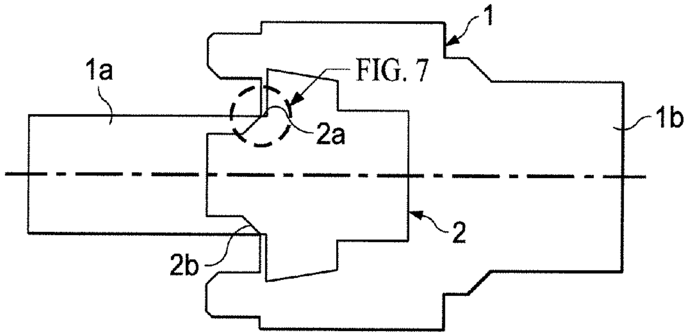
FIG. 6 shows a diagram of a first exemplary embodiment of an intake valve with a non-linear volumetric flow characteristic.

FIG. 6 shows a diagram of a first exemplary embodiment of an intake valve with a non-linear volumetric flow characteristic. This intake valve also has a valve body 1 which contains a hollow-cylindrical inlet opening 1*a* and an outlet opening 1*b*. Furthermore, the intake valve shown in FIG. 6 also has a closing body 2. This closing body is also connected to a spring (not illustrated) and closes the inlet opening 1*a* in the relieved state of said spring, with the result that no fuel can pass out of the fuel annular channel into the interior of the valve body 1 and from there via the outlet opening 1*b* into the interior of the associated cylinder of the high-pressure fuel pump. In contrast to the closing body which is shown in FIG. 5, the closing body 2 is not configured to be flat in the direction of the inlet opening 1*a*, but rather has a circumferential step 2*a* and a circumferential bevel 2*b* on its side which faces the inlet opening 1*a*. On account of this step and the bevel, the intake valve shown in FIG. 6 has a non-linear volumetric flow characteristic.

Figure 7A:
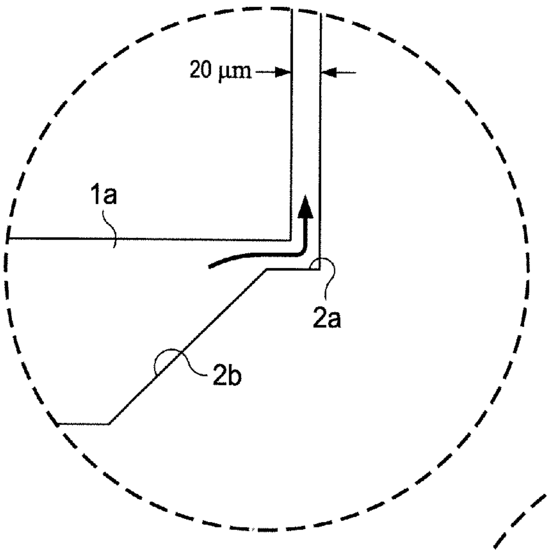
FIGS. 7*a* and 7*b* show enlarged details of the intake valve according to FIG. 6 in different opening positions of the closing body.
Figure 7B:
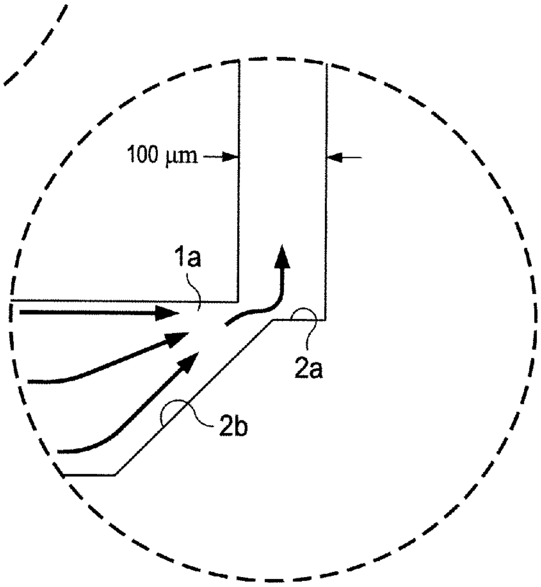

This will be illustrated in the following text using FIGS. 7*a* and 7*b*, said figures showing enlarged details of the intake valve according to FIG. 6 in different open positions of the closing body 2. Here, the closing body 2 is shown in FIG. 7*a* in a partially open state which corresponds to a stroke of 20 μm, and is shown in FIG. 7*b* in a more open state which corresponds to a stroke of 100 μm. It can be seen that, in this exemplary embodiment, the opening area of the valve has a non-linear relationship with the pressure or the pressure difference.

Figure 8:
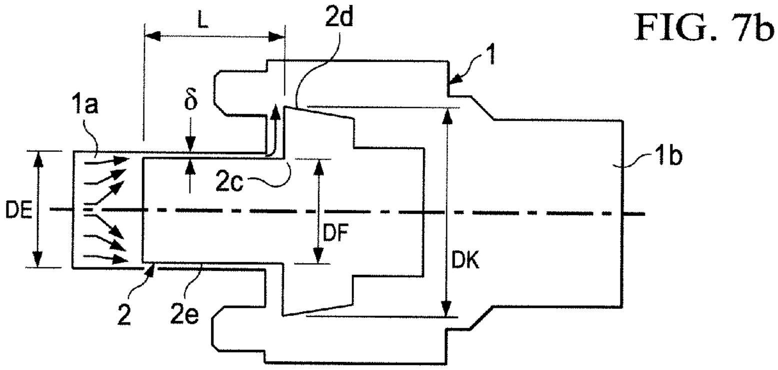
FIG. 8 shows a diagram of a second exemplary embodiment of an intake valve with a non-linear volumetric flow characteristic.

FIG. 8 shows a diagram of a second exemplary embodiment of an intake valve with a non-linear volumetric flow characteristic. This intake valve also has a valve body 1 which contains a hollow-cylindrical inlet opening 1*a* and an outlet opening 1*b*. Furthermore, the intake valve shown in FIG. 8 also has a closing body 2 which is connected to a spring (not illustrated) and closes the inlet opening 1*a* in the relieved state of said spring, with the result that no fuel can pass out of the fuel annular channel into the interior of the associated cylinder of the high-pressure fuel pump. In this exemplary embodiment, the closing body 2 has, on its side which faces the inlet opening 1*a*, a right-angled transition 2*c* which is provided between a cylindrical collar 2*d* of the closing body 2 and a cylindrical projection 2*e* of the closing body 2, which cylindrical projection 2*e* protrudes into the hollow-cylindrical inlet opening 1*a*. The length of the cylindrical projection 2*e* of the closing body 2 is denoted by the letter L. The diameter DK of the cylindrical collar 2*d* is greater than the diameter DE of the hollow-cylindrical inlet opening 1*a* and is also greater than the diameter DF of the cylindrical projection of the closing body 2. The diameter DF of the cylindrical projection is somewhat smaller than the diameter DE of the hollow-cylindrical inlet opening 1*a*. It holds that $$DF=DE-\delta.$$

Here, DF is the diameter of the cylindrical projection of the closing body, DE is the diameter of the hollow-cylindrical inlet opening and δ is the difference between the previously mentioned two diameters.

It can also be seen from FIG. 8 that, if the valve is opened, the relationship between the pressure and the opening area of the valve is non-linear.

As an alternative to the above-described exemplary embodiments, a non-linear volumetric flow characteristic can also be realized by intake valves, in which the valve body and the closing body are in each case of conical configuration in their contact region, the flanks not extending parallel to one another.

A further alternative embodiment consists of realizing a non-linear volumetric flow characteristic by way of an intake valve, in which there is a ball/cone transition in the contact region between the valve body and the closing body.

What is claimed is:

1. An intake valve for use with a cylinder of a high-pressure fuel pump of a common rail injection system, comprising:

a valve body, which has a right angle cylindrical inlet opening having a longitudinal axis, the inlet opening surrounded by a first flat annular surface forming a first seal face perpendicular to the longitudinal axis of the inlet opening, and a closing body disposed to move along the longitudinal axis of the inlet opening, the closing body including a second flat annular surface disposed at a right angle to the longitudinal axis of the inlet opening, the second flat annular surface forming a second seal face which can be moved relative to the inlet opening, a cylindrical projection disposed on the closing body which protrudes into the cylindrical inlet opening, the cylindrical projection having a length along the longitudinal axis and a diameter smaller than the length of the cylindrical projection, wherein a first position of the closing body disposes the second seal face of the closing body in a sealing relationship against the first seal face of the valve body, wherein at least one of a contour of the closing body and a contour of the valve body defines the volumetric flow characteristic of the intake valve as non-linear, and wherein in a closed position of the closing body, the cylindrical inlet opening and the cylindrical projection of the closing body protruding into the cylindrical inlet opening define a gap having a constant width along the full length of the cylindrical projection.

2. The intake valve according to claim 1, wherein, on its side which faces the inlet opening, the closing body has at least one of a step and a bevel.

3. The intake valve according to claim 1, wherein, on its side which faces the inlet opening, the closing body has a right-angled transition.

4. The intake valve according to claim 1, wherein a flow area of the inlet opening of the intake valve varies in a non-linear relationship with an opening pressure exerted upon the closing body.

5. The intake valve according to claim 1, further comprising:

a cylindrical collar formed on the closing body, the diameter of which is greater than the diameter of the cylindrical projection, and wherein a transition point between the cylindrical projection and the collar is of right-angled configuration.

6. A method for operating an intake valve for a cylinder of a high-pressure fuel pump of a common rail injection system, wherein the intake valve comprises a valve body, which has a right angle cylindrical inlet opening having a longitudinal axis, the inlet opening surrounded by a first flat annular surface forming a first seal face perpendicular to the longitudinal axis of the inlet opening, and a closing body disposed to move along the longitudinal axis of the inlet opening, the closing body including a second flat annular surface disposed at a right angle to the longitudinal axis of the inlet opening, the second flat annular surface forming a second seal face, the method comprising:

applying a pressure differential to the closing body, moving the closing body relative to the inlet opening wherein the closing body closes the inlet opening in a first end position, wherein the first end position of the closing body disposes the second seal face of the closing body in a sealing relationship against the first seal face of the valve body, wherein at least one of a contour of the closing body and a contour of the valve body defines the volumetric flow characteristic of the intake valve as non-linear, wherein a cylindrical projection disposed on the closing body protrudes into the cylindrical inlet opening, the cylindrical projection having a length along the longitudinal axis and a diameter smaller than the length of the cylindrical projection, and wherein in closed position of the closing body, the cylindrical inlet opening and the cylindrical projection of the closing body protruding into the cylindrical inlet opening define a gap having a constant width along the full length of the cylindrical projection.

7. The method according to claim 6, wherein, on its side which faces the inlet opening, the closing body has at least one of a step and a bevel.

8. The method according to claim 6, wherein, on its side which faces the inlet opening, the closing body has a right-angled transition, 9. The method according to claim 6, wherein a flow area of the inlet opening of the intake valve varies in a non-linear relationship with an opening pressure exerted upon the closing body.

10. The method according to claim 6, wherein the closing body includes a cylindrical collar, and wherein a transition point between the cylindrical projection and the collar is of right-angled configuration.

11. An intake valve for a cylinder of a high-pressure fuel pump of a common rail injection system, comprising:

a valve body, which has a right angle cylindrical inlet opening having a longitudinal axis, the inlet opening surrounded by a first flat annular surface forming a first seal face perpendicular to the longitudinal axis of the inlet opening, and a closing body disposed to move along the longitudinal axis of the inlet opening, the closing body including a second flat annular surface disposed at a right angle to the longitudinal axis of the inlet opening, the second flat annular surface forming a second seal face which can be moved relative to the inlet opening, a cylindrical projection disposed on the closing body which protrudes into the inlet cylindrical inlet opening, the cylindrical projection having a length along the longitudinal axis and a diameter smaller than the length of the cylindrical projection, wherein a first position of the closing body disposes the second seal face of the closing body in a sealing relationship against the first seal face of the valve body, wherein at least one of a contour of the closing body and a contour of the valve body is designed in such a way that the volumetric flow characteristic is non-linear, wherein a flow area of the inlet opening of the intake valve varies in a non-linear relationship with an opening pressure exerted on the closing body, and wherein in a closed position of the closing body, the cylindrical inlet opening and the cylindrical projection of the closing body protruding into the cylindrical inlet opening define a gap having a constant width along the full length of the cylindrical projection.

12. The intake valve according to claim 11, wherein the closing body has a cylindrical collar, the diameter of which is greater than the diameter of the cylindrical projection, and wherein a transition point between the cylindrical projection and the collar is of right-angled configuration.

* * * * *